(12) United States Patent
Smith et al.

(10) Patent No.: US 7,507,055 B2
(45) Date of Patent: Mar. 24, 2009

(54) APPARATUS AND METHOD FOR LAYING DOWN, ABANDONING, AND RECOVERING A PIPE ON THE SEA FLOOR

(75) Inventors: Stuart N. Smith, Turriff (GB); Mark K. Olson, Milltimber (GB)

(73) Assignee: Subsea 7 Ltd., Westhill (GB)

( * ) Notice: Subject to any disclaimer, the term of this patent is extended or adjusted under 35 U.S.C. 154(b) by 228 days.

(21) Appl. No.: 11/668,395

(22) Filed: Jan. 29, 2007

(65) Prior Publication Data

US 2007/0177944 A1 Aug. 2, 2007

(30) Foreign Application Priority Data

Jan. 31, 2006 (GB) .................................. 0601926.9

(51) Int. Cl.
*F16L 1/12* (2006.01)
(52) U.S. Cl. ....................................... 405/173; 405/158
(58) Field of Classification Search ................. 405/158, 405/173, 166
See application file for complete search history.

(56) References Cited

U.S. PATENT DOCUMENTS

| | | | | |
|---|---|---|---|---|
| 3,844,129 A | * | 10/1974 | Finlay | 405/166 |
| 3,851,492 A | * | 12/1974 | Cannon et al. | 405/158 |
| 4,444,528 A | * | 4/1984 | Scodino et al. | 405/173 |
| 5,380,129 A | * | 1/1995 | Maloberti et al. | 405/158 |
| 5,919,003 A | * | 7/1999 | Pregeant et al. | 405/173 |
| 6,149,347 A | * | 11/2000 | Scott | 405/158 |
| 6,729,802 B2 | * | 5/2004 | Giovannini et al. | 405/158 |
| 2007/0248418 A1 | * | 10/2007 | Steenhuis et al. | 405/158 |

* cited by examiner

*Primary Examiner*—Frederick L Lagman
(74) *Attorney, Agent, or Firm*—Haynes and Boone, LLP

(57) ABSTRACT

Disclosed are a method and apparatus for laying down, abandoning and/or recovering a pipe on the sea floor. During lay-down and abandonment, the pipe is lowered by a high capacity winch to an intermediate depth, at which the loading exerted by the pipe has dropped to within the rated capacity of a low capacity winch, to which the loading is then transferred. The high capacity winch line is then recovered to the attendant vessel and the pipe lowered to the sea floor using the low capacity winch. Pipe recovery is essentially a reversal of the above procedure.

In this way, the length of the line of the high capacity winch is considerably reduced, which reduces the winch size and hence cost.

38 Claims, 9 Drawing Sheets

APPARATUS AND METHOD FOR LAYING DOWN, ABANDONING, AND RECOVERING A PIPE ON THE SEA FLOOR

RELATED APPLICATIONS

This application claims priority to Great Britain Application No. 0601926.9 filed Jan. 31, 2006, entitled, "Apparatus and Method for Laying Down, Abandoning, and Recovering a Pipe on the Sea Floor."

BACKGROUND OF THE INVENTION

This invention relates to a method and apparatus for positioning a pipe on the sea floor, for laydown or abandonment, and recovering a pipe laid on the sea floor.

It is well known to lay pipe on the sea bed for conveying oil, gas and the like between two sites, such as a production well and adjacent production platform. In order to lay the pipe, a pipelaying vessel is used which typically discharges the pipe from a pipe storage drum on the vessel down into the sea while the vessel is advancing on the sea surface. Typically, the pipe adopts the shape of a catenary between the pipelaying vessel and the sea bed. The pipe may be a flexible pipe; alternatively, it may be a rigid (metal-walled) pipe, which requires to be passed through a straightener on the vessel, after it has been drawn off the pipe storage drum, in order to remove the plastic deformation that it has to undergo when it is wound onto the drum initially.

During pipelaying operations, it is necessary to complete the laying of each pipe length by lowering onto the sea floor the surface end (i.e. the second end) of the pipe that is being laid. This operation is known as either abandonment or lay down, depending on the circumstances.

In the case of abandonment, the pipe end is lowered to the sea bed and left there with the intent of subsequently recovering it to continue the previously interrupted pipelaying operations, for example due to adverse weather conditions. It should be noted that if abandonment becomes necessary when only part of the pipe length has been laid, it is necessary to cut the pipe and abandon the cut end.

In the case of lay down, recovery of the pipe end from the sea bed is not intended, because the pipe is to become part of a permanent installation—e.g. it is to be buried, or connected to other subsea equipment. In this case, the surface end of the pipe may or may not be fitted with some form of end attachment—e.g. collet connector, Pipeline End Termination (PLET), pig launcher etc.—prior to being lowered to the sea bed.

It will be appreciated that lowering of the pipe end to the sea bed, can be a planned operation such as would be effected at the end of a pipelaying operation (lay down), or when the vessel has to return to a shore side spooling base for a further load of pipe (abandonment). Alternatively, it may have to be undertaken in certain unplanned circumstances, such as during bad weather when the vessel has to leave the work site (abandonment).

Following abandonment, the vessel will return at a suitable later time to resume pipelaying. The pipe end has to be recovered from the sea bed, before pipelaying can recommence.

To perform the operations of lay-down, abandonment and recovery, an Abandonment and Recovery (A&R) winch has conventionally been used. The winch line, which may take the form of wire, cable, or synthetic rope, is attached to an end portion of the pipe and the winch is operated to lower and lift the pipe, as required. The A&R winch has to be rated, so as to be able to carry the loading of the longest length of a given pipe likely to extend from the pipelaying vessel to the sea floor. If the water is very deep, then the pipe length reaching from the sea bed up to the vessel will exert a correspondingly high loading on the A&R winch. For example, if the sea water has a depth of 3000 meters, the suspended pipe length could weigh about 400 tons (406 tonnes). Accordingly, the A&R winch has to be rated to at least this capacity. It also needs to have storage capacity for at least 3000 meters (3 kilometers) of the large, heavy and very expensive wire that has to be used for lowering the pipe to the sea floor.

In practice, since A&R operations (as well as lay-down operations) generally take place at depths considerably shallower than 3000 meters and since the necessary operations cannot be handled as conveniently with a 400 ton (406 tonne) winch as with a 200 ton (203 tonnes) winch, the lay vessel is typically equipped with a smaller capacity A&R winch as well. For example, a vessel equipped with a 400 ton (406 tonne) A&R winch might typically also be provided with a 200 ton (203 tonnes) A&R winch, for abandonment and recovery operations at relatively less deep sea floor locations. The reduced wire diameter for the smaller capacity winch (for example 76 mm /3 inches) for the wire wound on a 200 ton (203 tonnes) winch facilitates the handling operations as compared with when using a larger capacity winch (for example for a 400 ton (406 tonnes) winch, which would have a wire size of about 114 mm (4.5 inches).

The disadvantage with the pipelaying equipment described is that the wire of the higher capacity winch has to be extremely strong in order that it can take the loads imposed by the pipe. This adds to cost. Furthermore, due to the weight of the large length of pipe needed to extend to depths of as much as 3000 meters and the large wire diameter needed to carry such large pipe loads, the higher capacity A&R winch has to have a large wire storage drum, which adds to the bulk and cost of the higher capacity winch.

SUMMARY OF THE INVENTION

According to the invention from one aspect, there is provided a method of positioning on the sea floor, from a floating vessel, a last end portion of a pipe that is being laid on the sea floor, comprising the steps of (i) lowering the last end portion of the pipe from a first lowering/raising device on the vessel to a depth in the sea that is less than the depth of the sea floor; (ii) transferring the load of the pipe to a second lowering/raising device on the vessel having a relatively lower capacity than the first lowering/raising device; and (iii) lowering the last end portion of the pipe from the lower capacity lowering/raising device to the sea floor.

As the end of the pipe is progressively lowered by the higher capacity lowering/raising device, the pipe beneath it is deposited on the sea floor and the loading on the higher capacity lowering/raising device diminishes. When the loading has reduced to within the rated capacity of the lower capacity lowering/raising device, it is transferred from the higher capacity lowering/raising device to the lower capacity one and the higher capacity one can then be disconnected from the pipe end section and the wire retracted to the attendant vessel. Therefore, a lesser length of wire is required on the winch drum of the higher capacity lowering/raising device. This reduces space requirements and brings down the cost of the higher capacity lowering/raising device.

Conveniently, the higher capacity and lower capacity lowering/raising devices comprise a relatively high capacity winch and a relatively low capacity winch, respectively, the winches having a respective winch line for selectively taking the load of the pipe.

In a preferred way of putting the invention into effect, the winch line of the lower capacity winch is kept releasably connected to a connector body to which the last end portion of the pipe is kept releasably connected, during the lowering of the pipe from the higher capacity winch until after the load is transferred in step (ii), this winch line remaining under back tension that is just sufficient to take up any slack in this winch line. In this way, the winch line of the lower capacity winch is merely deployed, without becoming slack, as the pipe is lowered by the higher capacity winch with the loading of the pipe taken on the higher capacity winch, so that the lower capacity winch is always ready for the transfer of loading from the higher capacity winch to the lower capacity winch when the pipe loading has fallen to within the capacity of the lower capacity winch.

The method of putting the pipe end down on the sea floor may comprise the further step (iv), following step (iii), of disconnecting the lower capacity lowering/raising device from the connector body, where the pipe end has been abandoned for subsequent recovery, the attendant floating vessel may then leave the site at which the pipe has been abandoned, for example so as to take shelter from an approaching storm, or to collect a further load of pipe.

Alternatively, the method of putting the pipe end down on the sea floor may comprise the further step (iv) following step (iii), of disconnecting the connector body from the last end portion of the pipe on the sea floor. The connector body can then be raised to the attendant vessel, leaving the pipe end portion on the sea floor for abandonment or to be part of a permanent installation to be established, following laying-down of the pipe.

The mid-water transfer of loading from the lower capacity lowering/raising device to the higher capacity lowering/raising device may be performed manually under operator control. However, it is preferred that the transfer of loading is performed automatically by monitoring the loading borne by the higher capacity lowering device and performing step (ii) in response to the monitored loading falling to a value within the capacity of the lower capacity lowering/raising device.

According to the invention from a second aspect, there is provided a method of recovering a pipe lying on the sea floor to a floating vessel, comprising the steps of (i) raising a last end portion of the pipe from the sea floor to a lesser depth in the sea, using a second lowering/raising device; (ii) transferring the load of the pipe to a first lowering/raising device on the vessel having a higher capacity than the second lowering/raising device; and (iii) raising the last end portion of the pipe to the vessel, using the higher capacity first lowering/raising device.

Again, therefore, a lesser length is needed for the winch cable of the higher capacity lowering/raising device, and the space requirements are less.

Correspondingly to the case of the first aspect of the invention, suitably the higher capacity and lower capacity lowering/raising devices comprise a higher capacity winch and a lower capacity winch, respectively, the winches having a respective winch line for selectively taking the load of the pipe.

In a preferred way of putting the invention into effect, the winch line of the lower capacity winch is kept releasably connected to a connector body to which the last end portion of the pipe is kept releasably connected, during the transfer of the pipe load during step (ii) and throughout step (iii), this winch line remaining under back tension that is at least just sufficient to take up any slack in this winch line until the load is transferred in step (ii). In this way, after the transfer of the pipe loading to the higher capacity lowering/raising device, the winch line of the lower capacity winch is wound up on the winch drum in a controlled manner at a rate commensurate with the rate at which the higher capacity winch is raising the pipe. Furthermore, there is the further advantage that after the end portion of the pipe has been raised to the vessel, a hold off clamp on the vessel can be operated to engage an end fitting on the end portion of the pipe, and then the lower capacity winch and higher capacity winch can be easily disconnected from the end portion of the pipe, since the releasable connections are readily accessible at this stage from the vessel.

Whilst the mid-water transfer of the loading from the one lowering/raising device to the other can be performed manually under operator control as in the case of the first aspect of the invention, it is preferred that this operation be performed automatically in that the loading borne by the lower capacity lowering/raising device is monitored and step (ii) is performed in response to the monitored loading reaching a threshold value within the capacity of the lower capacity lowering/raising device.

According to the invention from a third aspect, there is provided apparatus for use in performing the method as hereinbefore described, comprising (i) a first lowering/raising device for mounting on the vessel; (ii) a second lowering/raising device for mounting on the vessel, the second lowering/raising device having a lower capacity than the first lowering/raising device; and (iii) a connector body, the connector body having thereon a first connector for releasable connection to a last end portion of the pipe, a second connector releasably connected to the higher capacity lowering/raising device and a third connector releasably connected to the lower capacity lowering/raising device.

Again, this reduces the physical size, cost and operating power requirements of the first lowering/raising device.

Conveniently, the higher capacity and lower capacity lowering/raising devices each comprise a winch for drawing in or paying out a winch line wound on a winch drum, the winch line being adapted to be connected to the second or third connector as the case may be.

In a preferred embodiment, an on-board winch is mounted within the connector body for paying out a messenger wire through the second connector means, the free end of the messenger wire being adapted to be connected to the winch line of the higher capacity lowering/raising device, for guiding the latter to the second connector. This arrangement facilitates the re-connection of the higher capacity lowering/raising device to the second connector means.

Advantageously, each of the higher capacity and lower capacity lowering/raising devices is provided with a load sensor for monitoring the loading on the respective lowering/raising device. In this way, the optimum timing for transfer of the loading can be achieved, whether when laying down or abandoning the pipe or when recovering it. The loading transfer can be effected at the appropriate time under operator control, in dependence on the monitored loading, or it can be carried out automatically by a control system that is responsive to the monitored loading.

Ordinarily, the higher capacity and lower capacity lowering/raising devices are mounted on a floating vessel.

In a preferred arrangement, each of the first, second and third connectors is articulated to the connector body by means of a respective pivot. In this way, when the load is taken by one or the other of the high and low capacity winches, the connector body will tilt to bring the corresponding winch line and pipe end portion into alignment, the forces acting on the connector body then balancing.

In order to prevent each of the first to third connectors from hanging down in an uncontrolled manner under gravity when no loading is applied to them, each such connector is normally biased into a predetermined angular position about its pivot axis. Conveniently, the second and third connectors are biased normally into a vertical disposition above the pivots, but each can be pivoted against the bias action associated with the respective second or third connector about its pivot axis, and the first connector is biased normally into a vertical disposition below its pivot, but can be pivoted against the bias action associated with the first connector about its pivot axis. The biasing can be provided by respective spring arrangements for the first to third connectors.

Respective friction devices can be provided instead of the spring arrangements, to apply friction to the pivotal action of the pivots and thereby prevent the first to third, pivotally mounted, make/break connections from hanging down in an uncontrolled manner under gravity, the arrangement being such that when the apparatus is under load, the loading overcomes the pivotal friction forces and the connector body tilts to balance the loading.

Another possibility is to provide respective locking devices for the first to third connectors which are each individually operable to selectively lock each connector in any one of a plurality of predetermined angular positions about its pivot axis. When the apparatus is to be put in use, the locking devices concerned need to be unlocked, typically by an ROV, which causes the connector body to tilt and the loading forces acting thereon to balance.

According to the invention from a fourth aspect, there is provided apparatus for use in performing the method as hereinbefore described, comprising (i) a connector body; (ii) a first connector on the connector body for releasable connection to a last end portion of the pipe; (iii) a second connector on the connector body for releasable connection to a first lowering/raising device mounted on the vessel; and (iv) a third connector on the connector body for releasable connection to a second lowering/raising device mounted on the floatable vessel, the second lowering/raising device having a lower capacity than the first lowering/raising device.

As in the case of the third embodiment of the invention, an on-board winch may be mounted within the connector body for paying out a messenger wire through the second connector, the free end of the messenger wire being adapted to be connected to the winch line of the first lowering/raising device, for guiding the latter to the second connector.

Many of the operations that need to be performed using the apparatus and method described above for laying down, abandoning and/or recovering the pipe on the sea bed can conveniently be performed using a remotely operated vehicle (ROV). As is well known, such a vehicle is a form of unmanned mini submarine remotely operated from the attendant floating pipelaying vessel. It is accordingly preferred that a docking point be provided on the connector body for a remotely operated subsea vehicle, to facilitate its functioning in attendance on the pipelaying apparatus.

In a preferred arrangement, each of the first, second and third connectors is articulated to the connector body by means of a respective pivot. In this way, when the load is taken by one or the other of the high and low capacity winches, the corresponding winch-line and the pipe end section will align themselves, the connector body tilting to accommodate such vertical alignment.

In order to prevent each of the first to third connectors from hanging down under gravity in an uncontrolled manner when no loading is applied to them, each such connector is normally biased into a predetermined angular position about its pivot axis. Conveniently, the second and third connectors are biased normally into a vertical disposition above the pivots, but each can be pivoted against the bias action associated with the respective second or third connector about its pivot axis, and the first connector is biased normally into a vertical disposition below its pivot, but can be pivoted against the bias action associated with the first connector about its pivot axis. The biasing can be provided by respective spring arrangements for the first to third connectors.

Respective friction devices can be provided instead of the spring arrangements, to apply friction to the pivotal action of the pivots and thereby prevent the first to third, pivotally mounted, connectors from hanging down under gravity in an uncontrolled manner, the arrangement being such that when the apparatus is under load, the loading overcomes the pivotal friction forces and the connector body tilts to balance the loading.

Another possibility is to provide respective locking devices for the first to third connectors which are each individually operable to selectively lock each connector in any one of a plurality of predetermined angular positions about its pivot axis. When the apparatus is to be put in use, the locking devices concerned need to be unlocked, for example by an ROV, so that the required alignment of the line concerned and pipe is allowed to occur.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION

Figures 1, 1A:
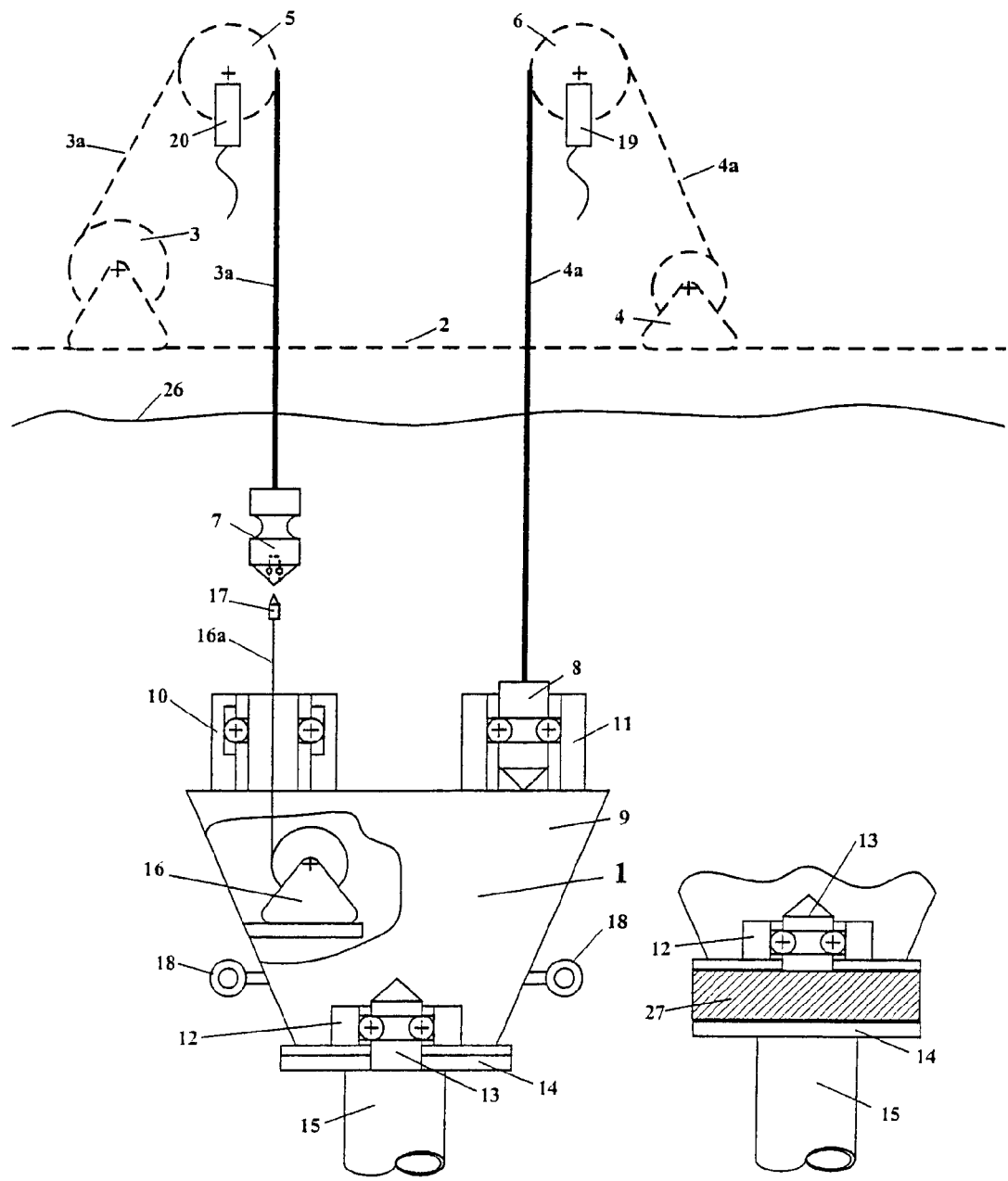
FIG. 1 is a schematic front elevational view, partly in section, of one form of pipe handling apparatus for laying, abandoning and recovering a pipe on the sea floor.
FIG. 1A is a schematic partial front view of the apparatus including a pipe end fitting for lay down.
Figure 7:
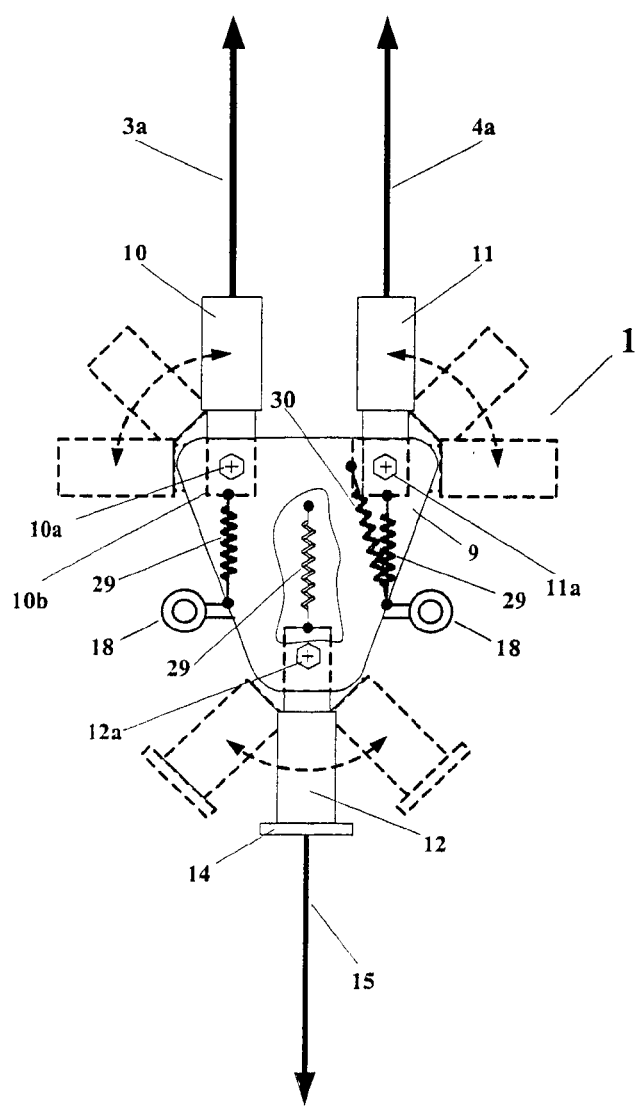
FIG. 7 is an elevational view corresponding to that of FIG. 1 (but omitting high and low capacity winches for ease of depiction), showing a preferred implementation of the pipe handling apparatus of FIG. 1.

Referring to FIG. 1, there is shown one form of pipe handling apparatus for use in laying down, abandoning and recovering a pipe on the sea floor, the apparatus being denoted generally by reference numeral 1. The apparatus is carried on a floating pipelaying vessel or ship at sea 26, the vessel or ship being very diagrammatically denoted by horizontal dotted line 2 in FIG. 1. The apparatus 1 is shown very schematically in FIG. 1, but a preferred practical implementation is shown in FIG. 7, to be described below.

The vessel 2 has pipelaying equipment on board, not shown, which lays flexible or rigid pipe 15, stored on a storage drum (again not shown) on the sea floor while the ship is progressing across the sea surface 26. The pipe is laid either at an acute angle to the vertical as it enters the water, or in a substantially vertical orientation, depending on the sea depth, and from there the pipe being laid assumes the shape of a catenary down to the sea floor. The pipe may typically be laid off the stern of the ship in an inclined or substantially vertical orientation, or it may be laid through a moonpool passing through the hull of the ship 2, in which case the lay angle will be substantially vertical (as depicted, by way of example), or at a small acute angle. Rigid pipe has to be passed through a straightener, which removes the residual curvature of the pipe as it is pulled off the drum. The pipe, whether flexible or rigid, is pulled from the storage drum by a tensioner, which in turn is mounted on a ramp that can be tilted to deploy the pipe into the sea at the correct lay angle. Such pipelaying arrangements are well known in the art and will not be further discussed herein.

When the length of pipe on the storage drum has been unwound and nearly the whole length of pipe laid on the sea bed, it is often necessary to also lower the last end portion of the pipe onto the sea bed. This may be a planned operation such as when it is needed to replenish the pipe on the storage reel at a spooling base located onshore, or because the pipelaying operation is complete, and subsea connections to the pipe end are to be effected, such as for wellhead completion. It may also be un-planned: for example because approaching bad weather necessitates termination of the pipe laying operation, either by abandoning the pipe end or by cutting the pipe and abandoning the cut end on the sea bed.

In the event of starting an entirely new pipelaying operation, another possibility would be to clear the space in the area of the pipe preparation and deployment region on the vessel, to enable the first end of the next length of pipe, stored on another storage drum, to be drawn off the drum and into an initial pipelaying position on the vessel, in which the pipe is engaged within a pipe tensioner for drawing the pipe off the new storage reel and deploying it in the sea, as described above for the preceding length of pipe.

In order to achieve the desired laydown, abandonment, or recovery of the last end portion of the pipe length, the apparatus 1 shown in FIG. 1 is used. This apparatus comprises a high capacity winch 3 and a low capacity winch 4, both mounted on the vessel 2. Purely by way of illustration, the respective capacity ratings of the high and low capacity winches 3, 4 are 400 tons (406 tonnes) and 200 tons (203 tonnes). The winches 3, 4 are able to pay out or wind in line 3a, 4a respectively, these lines passing over a sheave wheel 5, 6 and downwardly. Load sensors 19, 20 are associated with the sheave wheels 5, 6 for sensing the loading acting on these sheave wheels. Each line 3a, 4a is provided at its lower end with a connector, shown as a line end probe 7, 8, as shown in FIG. 1. However, other forms of end connector can be used instead, such as a clevis and pin arrangement. Suitably, each line 3a, 4a is a steel wire, but it can alternatively comprise any other flexible elongate means (line).

The apparatus 1 further comprises a connector body 9 of high structural strength for enabling the end of the laid pipe to be selectively lowered and raised by the line 3a or 4a. For this purpose, the connector body is provided at a top side thereof with respective, spaced-apart, make/break connectors 10, 11 that are secured to the connector body 9. Each make/break connector 10, 11 is designed to receive and engage with the line end probe 7, 8 of line 3a, 4a, respectively, to securely link each winch line with the connector body 9. Furthermore, the make/break connectors 10, 11 are designed so that they can be actuated, for selectively releasing the line end probes 7, 8 from the connectors 10, 11. Expediently, the engagement and release functions of the make/break connectors 10, 11 are designed to be effected by remotely operated vehicles (ROVs), which are well known and commonly used in performing such subsea operations in the oil industry.

The connector body 9 is also provided on a bottom side thereof with a further, preferably ROV-operable, make/break connector 12 designed to receive and engage with an end probe 13 of a pipe end fitting 14 on the end of the last end portion of the pipe 15. In corresponding fashion to the make/break connections 10, 11, the make/break connector 12 can be actuated by an ROV, to release the connector body 9 from the pipe end.

FIG. 1A shows a modification to FIG. 1, in which an end attachment 27 is interposed between the pipe end fitting 14 and end probe 13. The end attachment 27 serves to terminate the pipe in a connector device adapted for use in any subsequent (non-pipelaying) operations following lay-down, such as connecting to a sub-sea manifold or other installation, or to provide a pigging capability. In all other respects, the description of FIG. 1 applies correspondingly to the modification of FIG. 1A.

Mounted in the connector body is an on-board winch 16, which is also ROV-operable, which can pay out or wind in a messenger wire 16a through the make/break connector 10 and has a line end probe 17 on its free end which can be engaged with the line end probe 7 on the end of winch line 3a. The function of the messenger wire 16a will be described hereinbelow.

The connector body 9 is provided on its outside with at least one ROV docking point 18, to enable an ROV to dock with the connector body 9 and then perform certain subsea operations, as described hereinafter.

With reference to FIGS. 2A to 2F, the operation of the apparatus 1 will now be described, initially with reference to a pipe abandonment operation. It is assumed, initially, that a length of pipe has been laid on the sea floor and the last end portion extends up to the vessel in a catenary shape, indicated by reference numeral 21 in FIG. 2A, the pipe end fitting 14 being carried in conventional fashion by a hold-off clamp 23 on the vessel 2. As shown in the FIG. 2A, the winch lines 3a, 4a pass over the sheave wheels 5, 6 and hold the connector body 9 in a position spaced above the pipe end fitting 14.

Figures 2A, 2B, 2C, 2D, 2E, 2F:
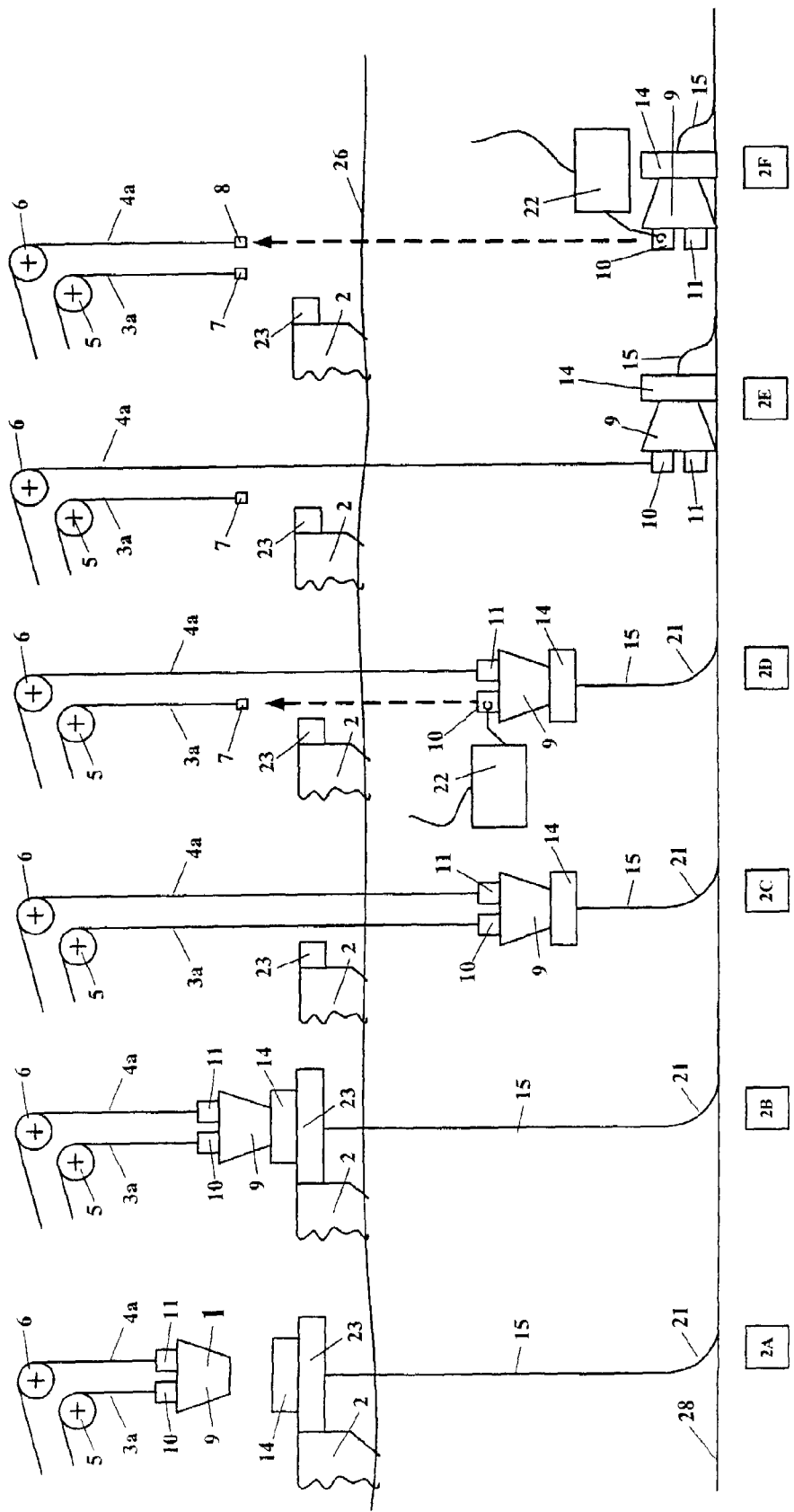
FIGS. 2A to 2F show successive stages in the abandonment of the end portion of a pipe on the sea bed, where the connector body remains attached to the pipe end on the sea floor.

Then, the connector body 9 attached to the lines 3a, 4a is lowered onto the end fitting 14 of the pipe and the end probe 13 introduced into and engaged with the make/break connector 12 (see FIG. 1), thereby connecting the connector body 9 to the pipe end fitting 14 (see FIG. 2B).

The pipe weight is now taken on the line 3a and high capacity winch 3, while a light and constant back tension is applied to the line 4a by the low capacity winch 4. The hold off clamp 23 can now be opened to release the pipe end, and the high capacity winch can now be operated to lower the connector body 9 and the last end portion of pipe 15 in a controlled manner, while low capacity winch 4 maintains application of the light and constant back tension on line 4a (FIG. 2C). It will be appreciated that, in this way, the line 4a is deployed at a rate to match the rate at which the connector body 9 and pipe end are lowered while removing slack from line 4a, so that low capacity winch 4 is ready to take over the pipe loading when required.

While the connector body 9 and last end portion of the pipe 15 are being lowered on line 3a, the vessel 2 continues to advance on the sea surface to maintain a desired catenary shape 21 for the pipe 15 extending between the vessel and the sea floor. It will be appreciated that as the pipe is paid out and the pipe end section is progressively lowered, the weight suspended on line 3a will progressively decrease. At some mid-water position for the pipe end between the sea surface and the sea bed, the downward loading on the connector body 9 will have decreased to below the rated capacity of the low capacity winch 4 (e.g. 200 tons/203 tonnes). When this happens, further lowering of the connector body from high capacity winch 3 is terminated and the low capacity winch 4 is operated so that the line 4a becomes tensioned to take up the load on the connector body 9. At this stage, the line 3a will be slack. The line end probe 7 is then released from make/break connector 10, using an ROV 22, and the high capacity winch 3 can then wind in line 3a, so as to raise the line end probe 7 to the level of the vessel 2 (see FIG. 2D).

Then, the vessel starts to advance again while the low capacity winch 4 progressively lowers the connector body 9, until it has been lowered to the sea bed, at which time the pipe will be in its abandonment position (FIG. 2E). Using the ROV 22, the line end probe 8 at the end of the line 4a is disconnected from the make/break connector means 11 and the line 4a, is then raised by low capacity winch 4, to bring the probe 8 to the level of the vessel to complete the abandonment procedure (FIG. 2F).

In the illustrative example given, the transfer of loading from the high capacity winch to the low capacity winch will have taken place when the pipe end is substantially halfway through its descent from the vessel to the sea floor. This means that the depth rating of the 400 ton (406 tonne) winch will have been reduced from 3000 meters (if that winch alone were to effect the lay-down of the pipe) to substantially 1500 meters. This in turn reduces the physical size of the high capacity winch 3, the space requirements for this winch on the lay vessel, the winch power requirements and the cost and complication of procuring and handling 3000 meters of line which typically will be in the form of a very heavy wire. Collectively, these advantages represent a major cost and space saving, offset solely by the need to provide the low capacity winch 4, which is much less problematic and relatively much less costly, and in any case is necessary for A&R operations in shallow water. In this regard, it is noted that whereas a 400 ton (406 tonnes) winch would typically require a wire having a diameter of circa 4.5 inches (114 mm), a 200 ton (203 tonnes) winch would require a wire diameter of merely circa 3 inches (76 mm).

It will be appreciated that the procedure just described leaves the connector body 9 on the sea bed, connected to the pipe end 14, as shown in FIG. 2F. Optionally, however, when performing an abandonment operation, the connector body 9 can be disconnected from pipe 15 and recovered to the vessel using the low capacity line 4a. This offers the advantage of avoiding the risk of contamination and/or damage to the connector body 9 and its make/break connections if it would otherwise have to be left for some extended period of time on the sea bed, connected to the pipe end, before being recovered.

Figures 3A, 3B, 3C, 3D, 3E, 3F:
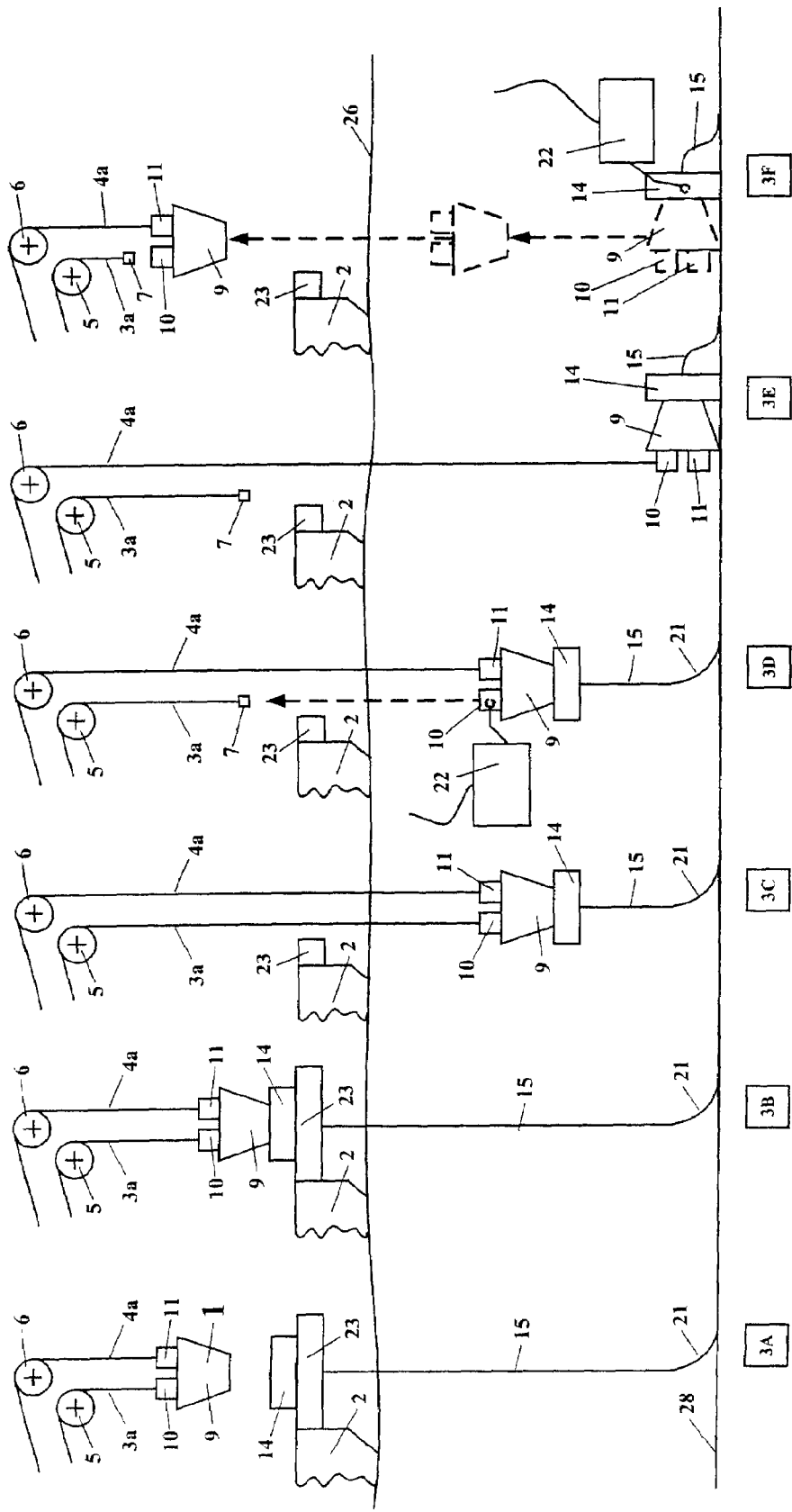
FIGS. 3A to 3F show successive stages in the abandonment of the pipe on the sea bed where the connector body is recovered to the surface.

The complete procedure involved is detailed in FIGS. 3A to 3F. As can be seen, this shows that the same sequence of procedural steps for pipe abandonment as were described above need to be performed, except that when the stage depicted in FIG. 3E has been reached, then as shown in FIG. 3F connector body 9 is disconnected from the pipe end 14, using ROV 22 and the make/break connector 12/13. The line 4a is then wound onto the low capacity winch 4 until the connector body 9 is raised to the level of the vessel.

The process of pipe recovery will now be described with reference to FIGS. 4A to 4F. These Figures show the process involved when the connector body 9 has remained connected to pipe end 14 on the sea bed at abandonment. FIGS. 5A to 5F illustrate the procedure for recovery following earlier abandonment, where the connector body was raised to the level of the vessel afterwards.

Figures 4A, 4B, 4C, 4D, 4E, 4F:
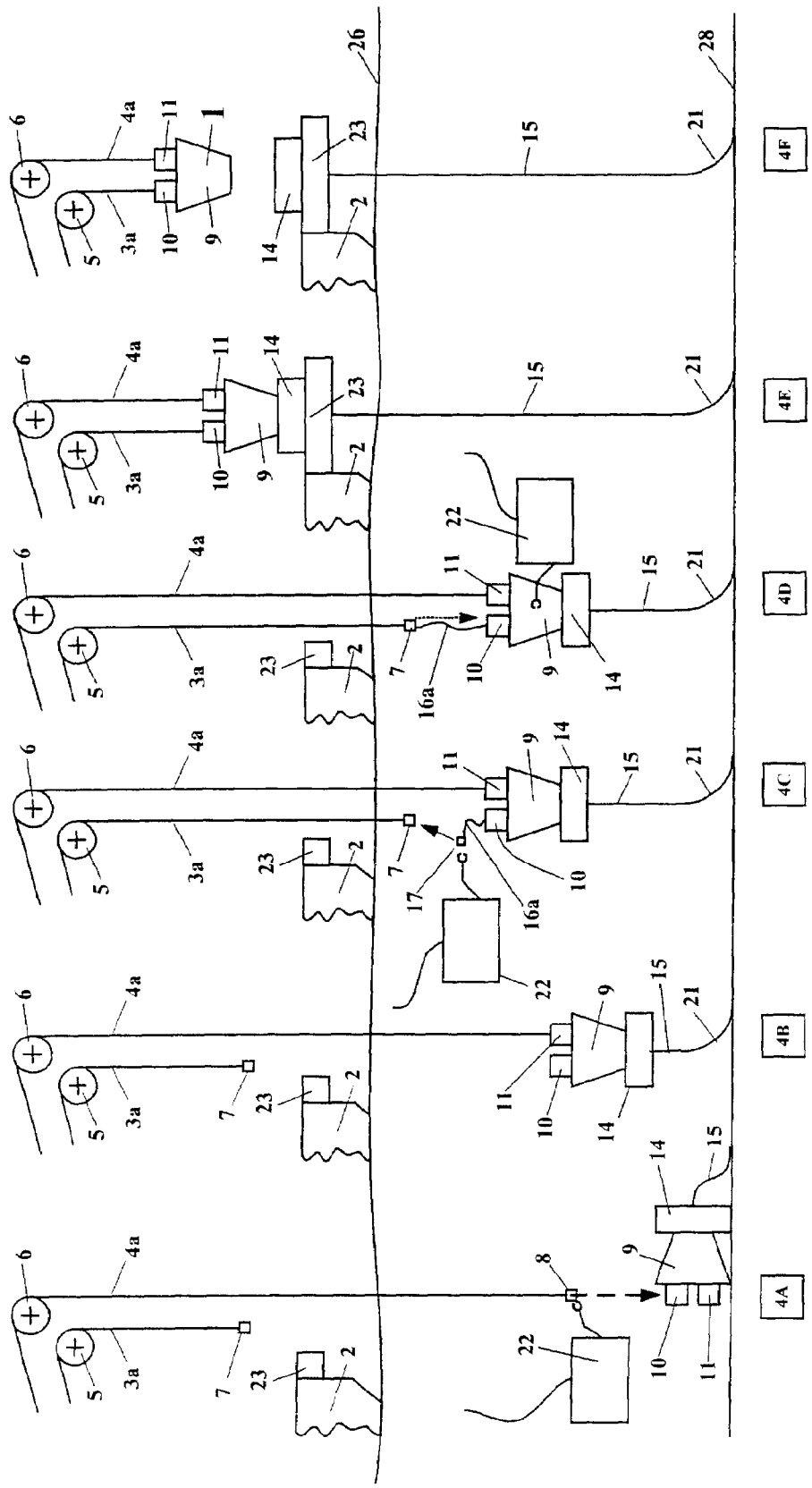
FIGS. 4A to 4F show successive stages in the recovery of the pipe from the sea floor starting with the connector body still attached to the pipe end.
Figures 5A, 5B, 5C, 5D, 5E, 5F:
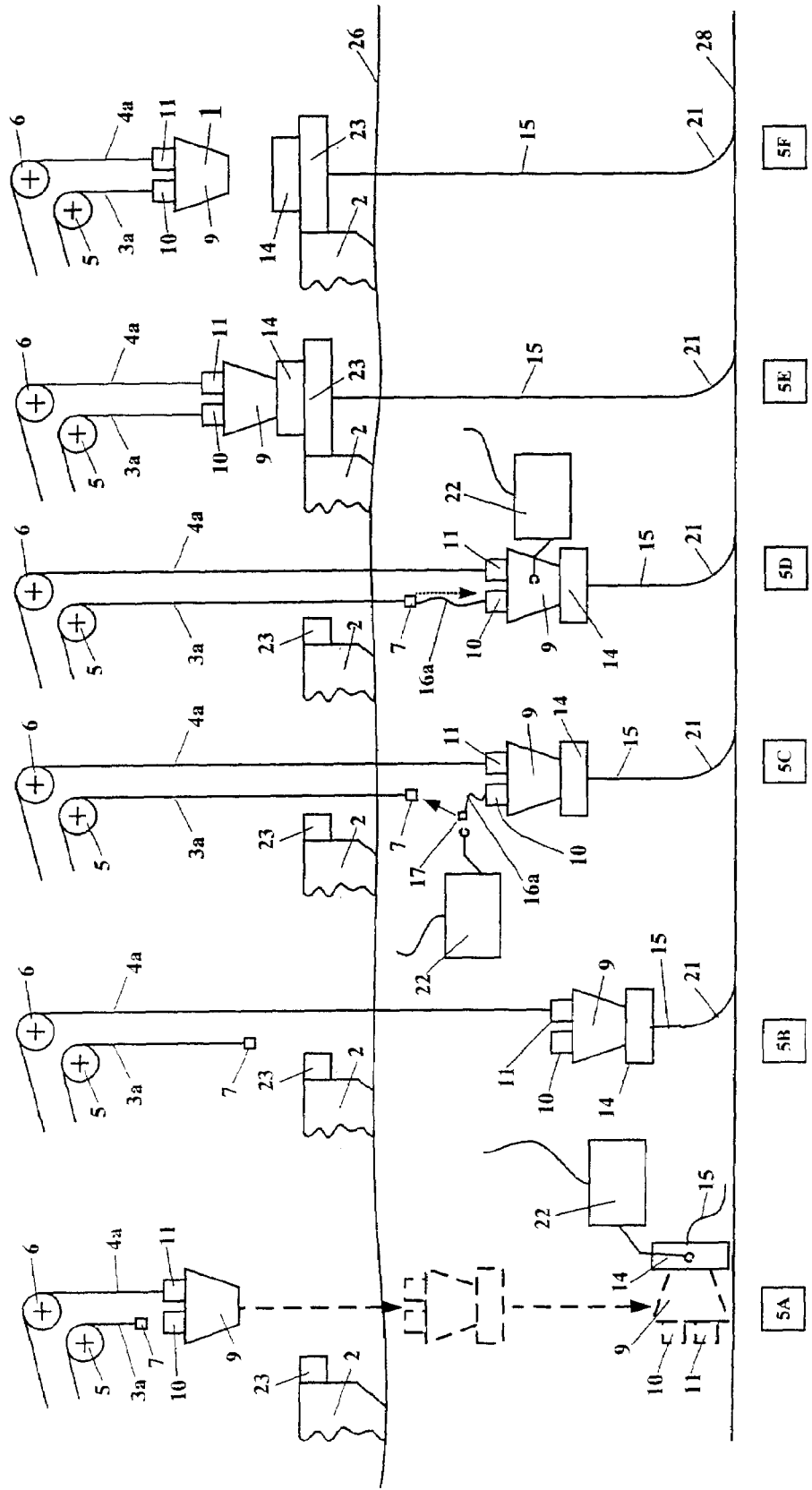
FIGS. 5A to 5F show successive stages in the recovery of the pipe from the sea floor, starting with the connector body on board the pipe laying vessel.
Figures 6A, 6B, 6C, 6D, 6E, 6F:
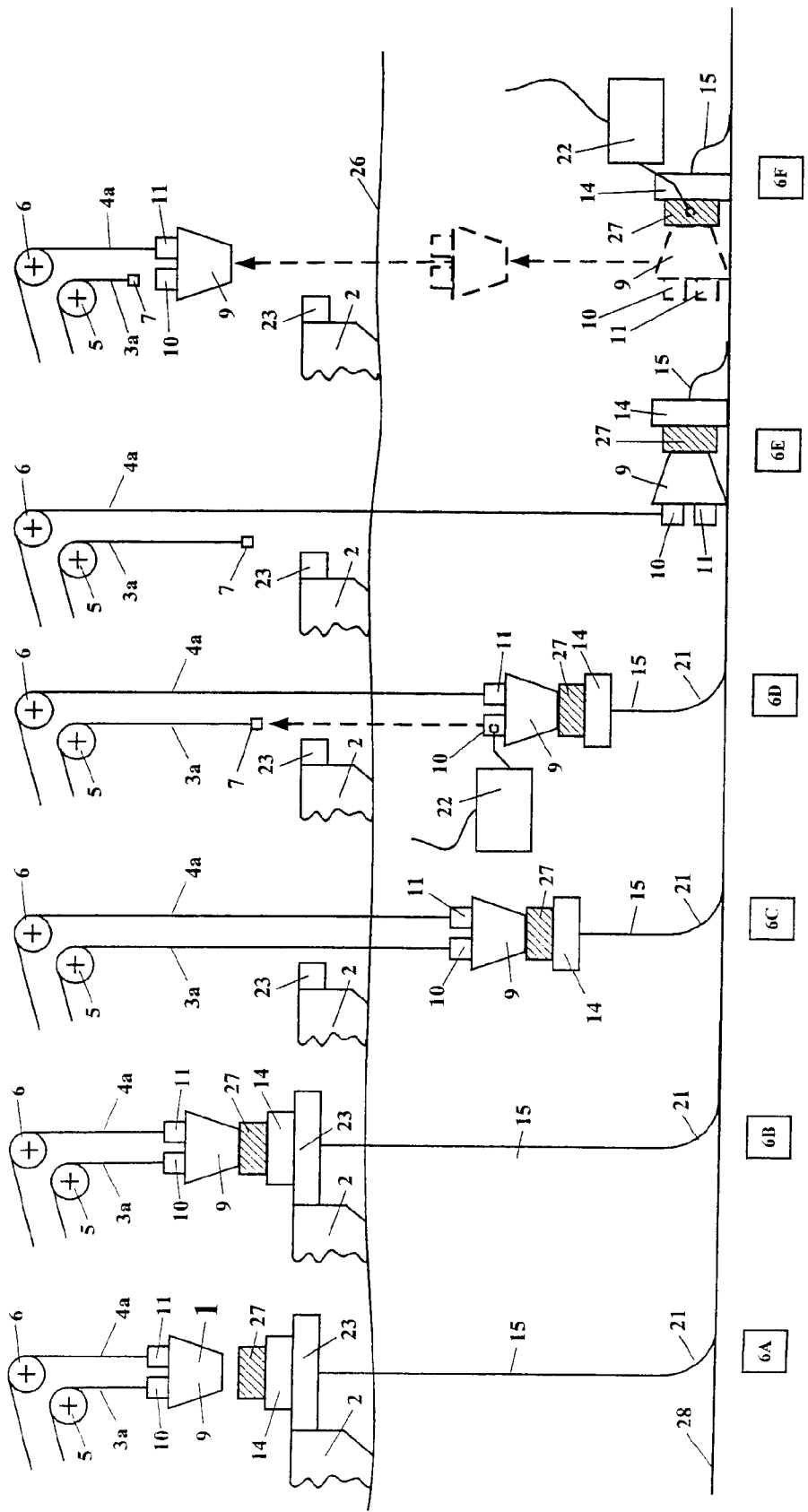
FIGS. 6A to 6F show successive stages in the lay down of the pipe end on to the sea floor, where an end attachment is interposed between the pipe end and the connector body.

With reference to FIG. 4A, the vessel 2 approaches on the sea surface 26, until it is close to the position on the sea bed where the pipe end is resting. The connector body 9 will also be on the sea floor, connected to the pipe end connector 14. Then, the low capacity winch 4 is operated to lower the line end probe 8 on line 4a to the connector body 9. ROV 22 is then used for engaging line end probe 8 in make/break connection 11.

The low capacity winch 4 is then run to start to raise the pipe end from the sea floor (see FIG. 4B).

As the pipe end is progressively raised, the loading on the low capacity winch 4 and its line 4a increases towards the maximum capacity of the low capacity winch. At an appropriate loading within the capacity of the winch, which capacity by way of illustrative example would be 200 tons (203 tonnes), the low capacity winch is stopped to hold the pipe end in that position. Then, the high capacity winch 3 is run so as to lower line end probe 7 on line 3a to the depth of the connector body 9. The ROV is deployed alongside the connector body and used to pull the messenger wire 16a out through make/break connector 10 and thereby unreel the messenger wire from the on-board winch 16 (see FIG. 1), until the ROV can engage probe 17 on the messenger wire 16a in line end probe 7, thereby attaching line 3a to messenger wire 16a. Next, the ROV 22 returns to and docks with the connector body 9, using the ROV docking point 18. It then operates the on-board winch 16 to wind the messenger wire 16a in, as indicated by the arrow in FIG. 4D, thereby drawing line end probe 7 into make/break connector 10, which engages with the end probe 7 and thus re-attaches line 3a to connector body 9. This sequence of operations to lower the line 3a of the high capacity winch 3 and re-connect it to connector body 9 using the ROV 22 is diagrammatically shown in FIGS. 4C & 4D.

The load is then taken up in line 3a by operating the high capacity winch 3, while the low capacity winch is operated so as to apply a light and constant back tension to line 4a. In this way, the connector body 9 and pipe end are raised on line 3a to the level of the attendant vessel 2. The hold off clamp 23 can then be closed to grip the pipe end fitting 14 (FIG. 4E).

The connector body 9 can then be disconnected from the pipe end fitting 14 and raised on lines 3a, 4a to above the hold off clamp 23 and safely out of the way (FIG. 4F). Normal pipelaying operations may then resume, such as by connecting the leading end of the next length of pipe to be laid to the end fitting 14 and then laying the next pipe length.

Alternatively and with reference to FIGS. 5a to 5F, if the connector body 9 was recovered to the vessel when the pipe was abandoned, as described with reference to FIG. 3F, then the low capacity winch 4 would be operated to lower the connector body 9 on the end of the winch line 4a from the vessel to the sea bed adjacent the pipe end. The ROV 22 would then be used to engage end probe 13 on the pipe end fitting 14 with make/break connector 12 on connector body 9 (see FIG.

5A). The pipe end is then recovered in the same way as described above in FIG. 4B to 4F and now repeated in FIGS. 5B to 5F.

FIG. 6A to 6F show successive stages in the laying down of the pipe end when it is configured as described with reference to FIG. 1A and where the pipe is to become part of a permanent installation. The description of the method of abandonment given with reference to FIGS. 3A to 3F applies correspondingly in the case of the method indicated with regard to FIGS. 6A to 6F.

It will be appreciated that when the apparatus 1 described above is lifting the pipe, then only one winch line will be under load at any time other than when the load is transferred from one winch to the other one. This one winch under load and the pipe will tend to align themselves, and consequently the body 9 will tend to tilt. However, the make/break connector 12 provides a rigid connection between the pipe 15, and connector body 9, and this arrangement resists the tilting of body 9. In doing so, strain is set up in the make/break connector 12 and the upper end portion of the pipe 15. This is due to the lateral offset between the point of attachment of the winch line under load to the connector body and the point of attachment of the pipe to the connector body. This situation also applies to connectors 10 and 11, and their respective associated lines 3a and 4a, but as the latter are flexible elements, the effect is less severe than that acting on the pipe 15.

Figure 7A:
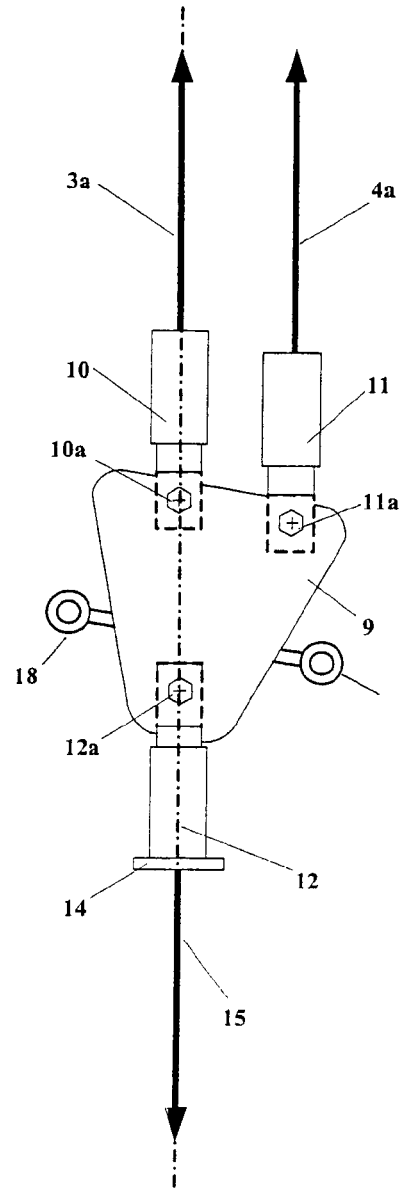
FIG. 7A shows the pipe handling apparatus when the loading is taken by a high capacity winch of the apparatus.

Reference is now made to FIG. 7 and 7A for details of a preferred implementation of the pipe handing apparatus of FIG. 1, in which the establishment of strain in the make/break connector 12 and the upper end section of the pipe 15 discussed in the preceding paragraph is avoided. In these Figures, the high and low capacity winches and their sheave wheels have been omitted for clarity.

As shown in FIG. 7, each of the make/break connectors 10, 11 and 12 is articulated to the connector body 9 by means of a respective pivot 10a, 11a or 12a, respectively. In this way, when the load is taken by one or the other of the high and low capacity winches 3, 4, the connector body will tilt so that the forces acting on it balance. It will be appreciated that the strain set up in the make/break connector 12 in the FIG. 1/1A embodiment and in the upper end portion of the pipe is largely avoided in the FIG. 7 modification, due to the use of the pivot 12a.

In order to prevent each of the articulated make/break connectors from hanging down under gravity in an uncontrolled manner when no loading is applied to that make/break connector, which would make it more difficult to connect the winch lines and pipe end section to the connector body initially, it is preferred that each such connector is normally biased into a predetermined angular position about its pivot axis. Specifically, as indicated in continuous outline in FIG. 7, the connectors 10/11 are biased normally into a vertical disposition above the pivots 10a, 11a, respectively, but each can be pivoted against the bias action through an angle to the side of the connector body 9, as indicated by the make/break connectors 10,11 shown in dotted lines. Similarly, the connector 12 is biased normally into a vertical disposition below the pivot 12a, but it can be pivoted through an angle to either side of the connector body 9, again as indicated in dotted outline. The biasing can be provided by respective springs 29 for each of the make/break connectors 10, 11 and 12. It will be appreciated that when, any connector is rotated to the position as shown in dotted outline against the spring bias, the respective spring is extended (as indicated by reference numeral 30 for the spring 29 associated with connector 11) to provide a restoring force. This restoring force will normally hold the connector in its continuous line position indicated in FIG. 7, but the bias force will be overcome when the connector is transmitting load.

Figures 8, 8A:
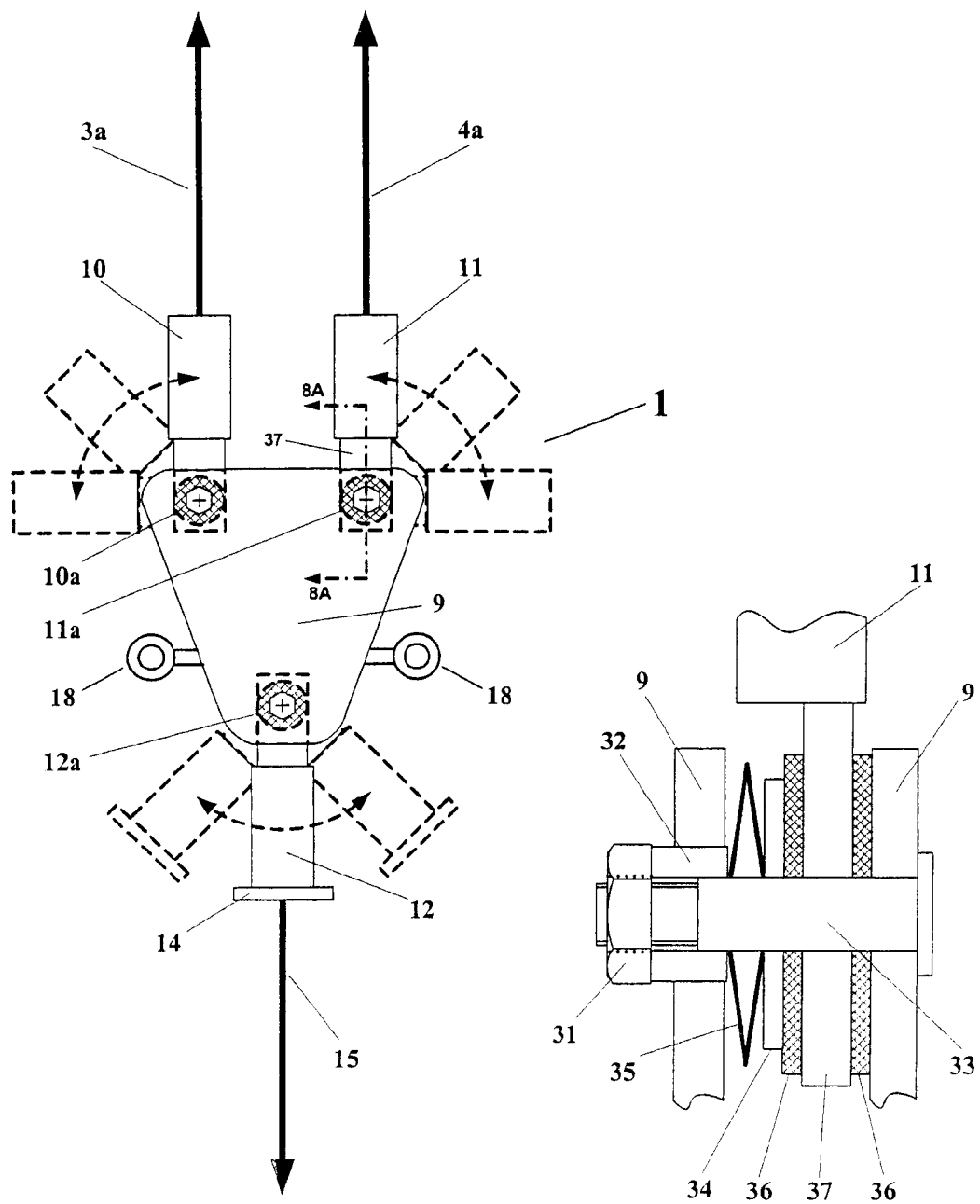
FIGS. 8 and 9 show respective alternative arrangements to those shown in FIG. 7.
FIGS. 8A and 9A are enlarged side section views taken along the lines 8A-8A of FIG. 8 and 9A-9A of FIG. 9, respectively.

Alternatively, as shown in FIGS. 8 and 8A, respective friction devices can be provided instead of the spring arrangements, to apply a (preferably adjustable) frictional pre-load to the pivotal action of the pivots and thereby normally prevent the pivotally mounted make/break connectors from rotation about their pivot axes under gravity. When the apparatus 1 is under load, the loading overcomes the pivotal friction pre-load forces so that the described vertical alignment of the lines concerned 3a, 4a and pipe 15 takes place.

The same adjustable friction mechanism can be used for all three connectors. FIG. 8A is a side view of a typical example (in this case for connector 11). It comprises respective friction discs 36 which are loaded against opposite faces of an extension piece 37 of the connector 11, by spring (Belleville) washers 35. Pre-load adjustment is achieved by rotation of adjustment nut 31 on an adjustment screw/pivot 33, that allows the connector 11 to pivot relative to the connector body 9. The nut 31 bears on the loading collar 32, and is rotatably adjusted in such a way as to increase/decrease the pre-compression of the spring washers 35. These in turn urge the friction discs 36 against the extension piece 37 of the connector 11, thus inhibiting its rotation. The level of friction is set so as to retain the connectors 10, 11 and 12 in the position required for connection of the lines 3a and 4a, and the pipe 15. At the same time it will be low enough to permit rotational adjustment of the angular positions of the connectors for alignment with the loads according to how these are applied during use.

Another possibility is to provide respective locking devices for the make/break connectors which can each be individually operable to selectively lock each make/break connector in any of the positions of a given set of predetermined, different, angular positions about its pivot axis. When the apparatus is to be put in use, the locking devices involved need to be unlocked, typically by an ROV, so that the winch line concerned and pipe are free to undergo alignment.

Figures 9, 9A:
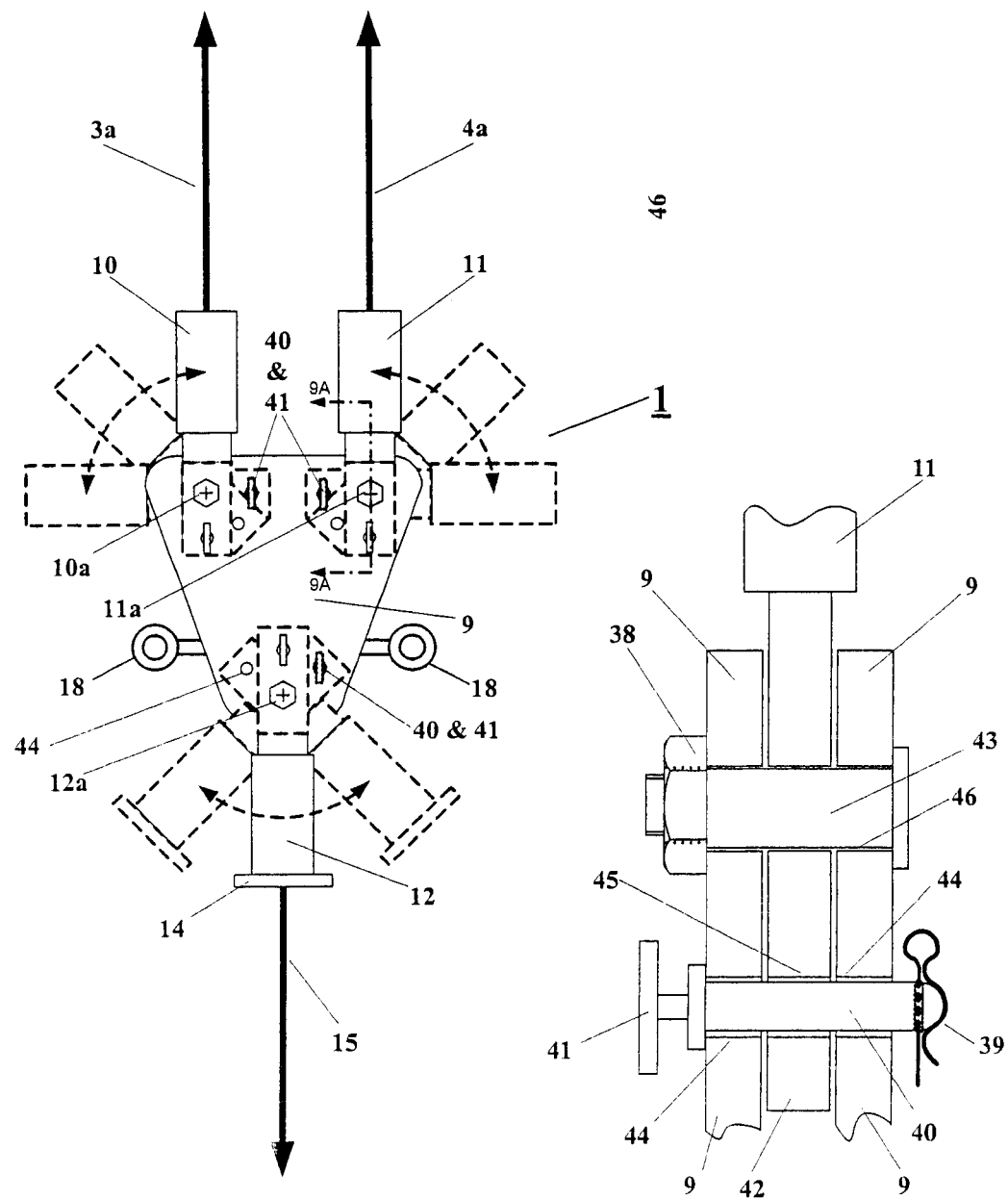

Accordingly, as shown in FIGS. 9, 9A, the connector body 9 is provided with a locking device for each connector 10, 11, 12. The locking device to be described is common to all three connectors.

FIG. 9A is a vertical sectional view through the locking device for connector 11. As shown, connector 11 rotates about a pivot pin 43 passing through an aligned pair of holes 46 in the connector body 9 and a hole formed in an extension piece 42 of connector 11. The pin 43 is held in place by nut 38. Extension piece 42 of connector 11 is drilled with hole 45. To lock the connector 11 in a selected position, the angular position of the connector about the pin 43 is adjusted to bring the hole 40 into register with one of a plurality of pairs of angularly spaced apart holes 44, drilled through the connector body 9. This pin is then inserted through the registered holes 40, 45 and retained in such selected position by spring clip 39 (e.g. an "R" clip). To release the connection, for which the pin would have been installed when the apparatus 1 was set up from the attendant surface ship, the spring clip 39 is removed, under sea, by an ROV, so that the pin 40 can then be withdrawn to release the connector 11, which is then free to pivot. To facilitate such manipulation of the pin by an ROV, it is preferably fitted with a "T" handle 41. When the pins of the upper connector concerned and the lower connector have been removed, the connector body will tilt to align the winch line concerned and the upper end portion of the pipe.

In order to ensure that the transfer of load as between the low capacity and high capacity winches is effected at an appropriate time, having particular regard to the maximum load bearing capacity of the low capacity winch, it is preferred to provide the load sensors 19, 20 (see FIG. 1) which determine the load acting on lines 3a, 4a, and thus on the high capacity and low capacity winches, respectively. The sensed loads may be monitored by an operator, for example by observing the loading values displayed on a screen or the like, the operator then deciding at which point to effect the transfer of loading. Alternatively, the transfer may be effected automatically by means of an appropriate control system or program which effects the necessary transfer of loading in dependence on the monitored loading values. Although transferring the load from the high capacity to the low capacity winch can be effected automatically during positioning the pipe end on the sea bed, re-connection and disconnection of these winches will normally be done by a mix of ROV and manual operations. The same applies to the reverse operation during pipe recovery.

It will be understood that although it is preferred, during abandonment or lay down, to transfer the loading from the higher capacity to the lower capacity winch at the earliest opportunity that the latter can safely handle the load, the transfer may be deferred to a lower loading of the high capacity winch. Similarly, during recovery, transfer of loading from the lower capacity to the higher capacity winch may be brought forward to a lower loading of the lower capacity winch (subject of course to the amount of wire available on the high capacity winch). It is preferable however to effect the load transfer when the loading on the lower capacity winch has increased to close to its rated maximum loading, since this minimises the length of wire that needs to be stored on the storage drum of the higher capacity winch, as well as the size of the drum itself, which in turn reduces the bulk and cost of this winch.

From the foregoing description, it will be appreciated that the described embodiment offers the significant advantage of reducing the size of the high capacity winch, and therefore its cost and power requirements.

The invention claimed is:

1. A method of positioning on a sea floor, from a floating vessel, a last end portion of a pipe that is being laid on the sea floor, comprising the steps of:
   lowering the last end portion of the pipe from a first lowering/raising device on the vessel to a depth in the sea that is less than the depth of the sea floor;
   transferring a load of the pipe to a second lowering/raising device on the vessel having a relatively lower capacity than the first lowering device; and
   lowering the last end portion of the pipe from the lower capacity second lowering/raising device to the sea floor.

2. A method according to claim 1, wherein the higher capacity first and lower capacity second lowering/raising devices comprise a higher capacity first winch and a lower capacity second winch, respectively, the first and second winches having respective first and second winch lines for selectively taking the load of the pipe.

3. A method according to claim 2, wherein the second winch line of the lower capacity second winch is kept releasably connected to a connector body to which the last end portion of the pipe is kept releasably connected, during the lowering of the pipe from the higher capacity first winch, the second winch line remaining under back tension that is at least just sufficient to take up slack in the second winch line until the load is transferred in the transferring step.

4. A method according to claim 3, comprising disconnecting the lower capacity second lowering/raising device from the connector body.

5. A method according to claim 3, comprising disconnecting the connector body from the last end portion of the pipe on the sea floor.

6. A method according to claim 3, wherein loading borne by the higher capacity first lowering/raising device is monitored and wherein said transferring a load of the pipe to a second lowering/raising device is performed in response to the monitored loading falling to a value within the capacity of the lower capacity second lowering/raising device.

7. A method according to claim 1, wherein loading borne by the higher capacity first lowering/raising device is monitored and wherein said transferring a load of the pipe to a second lowering/raising device is performed in response to the monitored loading falling to a value within the capacity of the lower capacity second lowering/raising device.

8. A method of recovering from a floating vessel a pipe lying on a sea floor, comprising the steps of:
   raising a last end portion of the pipe from the sea floor to a depth less than a depth of the sea floor, using a second lowering/raising device;
   transferring a load of the pipe to a first lowering/raising device on the vessel having a higher capacity than the second lowering/raising device; and
   raising the last end portion of the pipe to the vessel, using the higher capacity first lowering/raising device.

9. A method according to claim 8, wherein the higher capacity first and lower capacity second lowering/raising devices comprise a higher capacity first winch and a lower capacity second winch, respectively, the first and second winches having respective first and second winch lines for selectively taking the load of the pipe.

10. A method according to claim 9, wherein the second winch line of the lower capacity second winch is kept releasably connected to a connector body to which the last end portion of the pipe is kept releasably connected, during said transferring a load of the pipe and during said raising the last end portion of the pipe to the vessel, using the higher capacity first lowering/raising device the second winch line remaining under back tension that is at least just sufficient to take up slack in the second winch line until said transferring a load of the pipe.

11. A method according to claim 10, comprising:
   operating a hold off clamp on the vessel, after the end portion of the pipe has been raised to the vessel, to engage an end fitting on the end portion of the pipe; and
   disconnecting the connector body from the end portion of the pipe.

12. A method according to claim 10, comprising:
   monitoring the loading borne by the lower capacity second lowering/raising device; and
   performing said transferring a load of the pipe in response to the monitored loading reaching a threshold value within the capacity of the lower capacity second lowering/raising device.

13. A method according to claim 8, comprising:
   monitoring the loading borne by the lower capacity second lowering/raising device; and
   performing said transferring a load of the pipe in response to the monitored loading reaching a threshold value within the capacity of the lower capacity second lowering/raising device.

14. Apparatus for recovering a pipe from or lowering a pipe towards a sea floor from a floating vessel, comprising:
   a first lowering/raising device configured to be mounted on the vessel;

a second lowering/raising device configured to be mounted on the vessel, the second lowering/raising device having a lower capacity than the first lowering/raising device; and a connector body having thereon a first connector configured for releasable connection to a last end portion of the pipe, a second connector configured for releasable connection to the higher capacity first lowering/raising device, and a third connector configured for releasable connection to the lower capacity second lowering/raising device.

15. Apparatus according to claim 14, wherein the higher capacity first and lower capacity second lowering/raising devices respectively comprise a first and a second winch for drawing in or paying out respectively a first and a second winch line wound on respective first and a second winch drums, the first winch line being adapted to be connected to the second connector and the second winch line being adapted to be connected to the third connector.

16. Apparatus according to claim 15, wherein an on-board winch is mounted within the connector body and configured to pay out a messenger wire through the second connector, the messenger wire including a free end adapted to be connected to the first winch line of the higher capacity first lowering/raising device, and adapted for guiding the first winch line to the second connector.

17. Apparatus according to claim 15, wherein the first winch line is adapted to connect to the second connector and adapted to connect to the third connector, and wherein the second winch line is adapted to connect to the second connector and adapted to connect to the third connector.

18. Apparatus according to claim 15, wherein each of the higher capacity first and lower capacity second lowering/raising devices is provided with a load sensor for monitoring the loading on the respective first or second lowering/raising device.

19. Apparatus according to claim 14, wherein each of the higher capacity first and lower capacity second lowering/raising devices is provided with a load sensor for monitoring the loading on the respective first or second lowering/raising device.

20. Apparatus according to claim 14, wherein the higher capacity first and lower capacity second lowering/raising devices are mounted on a floating vessel.

21. Apparatus according to claim 14, wherein each of the first, second and third connectors is articulated to the connector body by means of a respective pivot.

22. Apparatus according to claim 21, wherein each of the first, second, and third connectors defines a pivot axis and is normally biased into a predetermined angular position about the pivot axis.

23. Apparatus according to claim 22, wherein the second and third connectors are biased normally into a vertical disposition above the respective pivots, but each is configured to be pivoted against the bias action associated with the respective second or third connector about its respective pivot axis, and wherein the first connector is biased normally into a vertical disposition below its respective pivot, but is configured to be pivoted against the bias action associated with the first connector about its respective pivot axis.

24. Apparatus according to claim 23, wherein the biasing is provided by respective spring arrangements for the first to third connectors.

25. Apparatus according to claim 22, wherein the biasing is provided by respective spring arrangements for the first to third connectors.

26. Apparatus according to claim 21, including respective friction devices configured to prevent the first, second, and third, pivotally mounted, connectors from hanging down under gravity in an uncontrolled manner, and wherein the arrangement being such that when the apparatus is under load, the loading overcomes pivotal friction forces of the friction devices and the connector body tilts to balance the loading.

27. Apparatus according to claim 26, including first, second, and third locking devices provided for the respective first, second, and third connectors, the first, second, and third locking devices being individually operable to selectively lock the respective first, second, and third connectors in a selected angular position about the respective pivot axis.

28. Apparatus according to claim 14, wherein a docking point is provided on the connector body for a remotely operated subsea vehicle.

29. Apparatus for positioning on a sea floor, from a floating vessel, a last end portion of a pipe that is being laid on the sea floor, the apparatus comprising:

a connector body;

a first connector on the connector body configured to releasably connect to a last end portion of the pipe;

a second connector on the connector body configured to releasably connect to a first lowering/raising device mounted on the vessel; and a third connector on the connector body configured to releasably connect to a second lowering/raising device mounted on the floatable vessel, the second lowering/raising device having a lower capacity than the first lowering/raising device.

30. Apparatus according to claim 29, including an on-board winch mounted within the connector body, the on-board winch being configured to pay out a messenger wire through the second connector, the messenger wire having a free end adapted to be connected to a winch line of the higher capacity first lowering/raising device, for guiding the winch line to the second connector.

31. Apparatus according to claim 29, wherein a docking point is provided on the connector body for a remotely operated subsea vehicle.

32. Apparatus according to claim 29, wherein each of the first, second and third connectors is articulated to the connector body by a respective pivot.

33. Apparatus according to claim 32, wherein each of the first, second, and third connectors is normally biased into a predetermined angular position about a respective first, second, and third pivot axes.

34. Apparatus according to claim 33, wherein the second and third connectors are biased normally into a vertical disposition above the second and third pivots, and the second and third connectors are configured to be pivoted against the bias action associated with the respective second or third connector about the respective second and third pivot axes, and wherein the first connector is biased normally into a vertical disposition below the first pivot, and the first connector is configured to be pivoted against the bias action associated with the first connector about the first pivot axis.

35. Apparatus according to claim 34, including respective spring arrangements configured to provide the biasing for the first, second, and third connectors.

36. Apparatus according to claim 33, including respective spring arrangements configured to provide the biasing for the first, second, and third connectors.

37. Apparatus according to claim 29, including respective friction devices configured to the first, second, and third, pivotally mounted, connectors from hanging down under gravity in an uncontrolled manner, the arrangement being such that when the apparatus is under load, the loading overcomes pivotal friction forces of the friction devices and the connector body tilts to balance the loading.

38. Apparatus according claim 29, including first, second, and third locking devices provided for the respective first, second, and third connectors, the first, second, and third locking devices being individually operable to selectively lock the respective first, second, and third connectors in any one of a plurality of predetermined angular positions about the respective pivot axis.

* * * * *